(12) United States Patent
Tav et al.

(10) Patent No.: US 12,464,314 B2
(45) Date of Patent: Nov. 4, 2025

(54) CROWD DENSITY ANALYSIS WITH MULTIPLE REGIONS

(71) Applicant: INTERNATIONAL BUSINESS MACHINES CORPORATION, Armonk, NY (US)

(72) Inventors: Doga Tav, Fredericton (CA); Matthias Seul, Folsom, CA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 18/186,993

(22) Filed: Mar. 21, 2023

(65) Prior Publication Data

US 2024/0323640 A1 Sep. 26, 2024

(51) Int. Cl.
*H04W 4/021* (2018.01)
*G16Y 10/75* (2020.01)
*G16Y 40/60* (2020.01)
*H04W 4/029* (2018.01)
*H04W 8/22* (2009.01)

(52) U.S. Cl.
CPC ............. *H04W 4/021* (2013.01); *G16Y 10/75* (2020.01); *G16Y 40/60* (2020.01); *H04W 4/029* (2018.02); *H04W 8/22* (2013.01)

(58) Field of Classification Search
CPC ....... H04W 4/021; H04W 4/029; H04W 8/22; G16Y 10/75; G16Y 40/60
See application file for complete search history.

(56) References Cited

U.S. PATENT DOCUMENTS

| | | |
|---|---|---|
| 6,633,760 B1 | 10/2003 | Ham et al. |
| 7,095,336 B2 | 8/2006 | Rodgers |
| 9,679,487 B1 | 6/2017 | Hayward |

(Continued)

FOREIGN PATENT DOCUMENTS

| | | |
|---|---|---|
| CN | 102663359 B | 9/2012 |
| CN | 110545558 A | 12/2019 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Marcos L Torres
(74) *Attorney, Agent, or Firm* — Michael O'Keefe (57) ABSTRACT

According to one embodiment, a method, computer system, and computer program product for crowd density analysis with multiple regions is provided. The embodiment may include identifying three or more local measurement nodes. The embodiment may also include defining one or more bins, each bin comprising at least three local measurement nodes from the three or more local measurement nodes. The embodiment may further include mapping one or more regions corresponding to a bin from the one or more bins. The embodiment may also include identifying a device in a region. The embodiment may further creating a profile corresponding to the identified device. The embodiment may also include calculating a population density based on a number of created profiles in a region from the one or more regions.

20 Claims, 4 Drawing Sheets

(56) References Cited

U.S. PATENT DOCUMENTS

| | | |
|---|---|---|
| 9,881,217 B2 | 1/2018 | Wang |
| 10,395,521 B2 | 8/2019 | Bansal |
| 12,262,282 B2 | 3/2025 | Tav et al. |
| 2004/0015607 A1 | 1/2004 | Bender et al. |
| 2005/0063324 A1 | 3/2005 | O'Neill et al. |
| 2007/0155390 A1 | 7/2007 | Kodikara Patabandi et al. |
| 2012/0115505 A1 | 5/2012 | Miyake |
| 2015/0172856 A1 | 6/2015 | Vanderwater et al. |
| 2015/0304815 A1 | 10/2015 | Ghose |
| 2016/0033285 A1 | 2/2016 | Hardin et al. |
| 2016/0037480 A1 | 2/2016 | Bellamkonda et al. |
| 2016/0196577 A1 | 7/2016 | Reese et al. |
| 2016/0219398 A1 | 7/2016 | Kamensky |
| 2017/0006429 A1 | 1/2017 | Douglas et al. |
| 2018/0286225 A1 | 10/2018 | Lu |
| 2019/0011925 A1 | 1/2019 | Bansal |
| 2019/0028852 A1 | 1/2019 | Yamada |
| 2019/0208432 A1 | 7/2019 | Carney Landow |
| 2019/0361950 A1 | 11/2019 | Ganesan et al. |
| 2020/0322916 A1* | 10/2020 | Ta .................... H04W 4/029 |
| 2021/0006933 A1* | 1/2021 | Dean .................. G16Y 40/10 |
| 2023/0109089 A1 | 4/2023 | Tav et al. |

FOREIGN PATENT DOCUMENTS

| | | |
|---|---|---|
| CN | 118160328 A | 6/2024 |
| EP | 4413753 A1 | 8/2024 |
| WO | 2015009453 A1 | 1/2015 |
| WO | 2023/057190 A1 | 4/2023 |

OTHER PUBLICATIONS

European Patent Office, "EP Examination Report", Mar. 9, 2025, 05 pages, EP Application No 22789885.5.
"Patent Cooperation Treaty PCT International Search Report", Applicant's File Reference: P202002240, International Application No. PCT/EP2022/075836, International Filing Date: Sep. 16, 2022, Date of Mailing: Jan. 18, 2023, 10 pages.
Abedi, et al., "Bluetooth and Wi-Fi MAC Address Based Crowd Data Collection and Monitoring: Benefits, Challenges and Enhancement," 36th Australasian Transport Research Forum (ATRF), Oct. 2013, 18 pages, ReasearchGate, Brisbane, AU, Retrieved from the Internet: <URL: https://www.researchgate.net/publication/259900889_>.
Author Unknown, "Emerging Hot Spot Analysis," ArcGIS Desktop, Accessed: Aug. 17, 2021, https://desktop.arcgis.com/en/arcmap/10.3/tools/space-time-pattern-mining-toolbox/emerginghotspots.htm, 4 pages.
Author Unknown, "How Kernel Density works," ArcGIS Pro 2.8, Accessed: Aug. 17, 2021, https://pro.arcgis.com/en/pro-app/latest/tool-reference/spatial-analyst/how-kernel-density-works.htm, 6 pages.
Basalamah, "Crowd Mobility Analysis using WiFi Sniffers," (IJACSA) International Journal of Advanced Computer Science and Applications, vol. 7, No. 12, 2016, pp. 374-378.
Besimaltnok, "WiPi-Hunter / PiDense," GitHub, Sep. 21, 2018, https://github.com/WiPi-Hunter/PiDense, 4 pages.
Boulmakoul et al., "Moving Object Trajectories Meta-Model and Spatio-Temporal Queries," International Journal of Database Management Systems ( IJDMS ) vol. 4, No. 2, Apr. 2012, DOI: 10.5121/ijdms.2012.4203, pp. 35-54.

Chilipirea, et al., "Presumably simple: monitoring crowds using WiFi," 17th International Conference on Mobile Data Management, Jun. 2016, ResearchGate, Porto, Pt, DOI: 10.1109/MDM.2016.42, Retrieved from the Internet: <URL: https://www.researchgate.net/publication/303843715_>, 11 pages.
Depatla et al., "Crowd Counting Through Walls Using WiFi," 2018 IEEE International Conference on Pervasive Computing and Communications (PerCom), Downloaded Aug. 17, 2021, IEEE Xplore, 10 pages.
Hak5, "WiFi Pineapple," Shop.hak5.org, Accessed: Aug. 17, 2021, https://shop.hak5.org/products/wifi-pineapple?variant=32019576094833#TOP, 8 pages.
Hiermersdorf, et al., "Sensing in Rich Bluetooth Environments," Workshop on World-Sensor-Web WSW'06 at SenSys'06 [article], 2006, ACM, Boulder, CO, US, Retrieved from the Internet: <URL: http://cosco.hiit.fi/Articles/wsw06.pdf>, 5 pages.
Kostakos, et al. "Wireless detection of end-to-end passenger trips on public transport buses," 13th International IEEE Conference on Intelligent Transportation Systems, Sep. 2010, IEEE, Funchal, PT, DOI: 10.1109/ITSC.2010.5625062, Retrieved from the Internet: <URL: https://ieeexplore.ieee.org/document/5625062>, pp. 1795-1800.
Lee, et al., "Real-time autonomous crowd control system via detection of crowd anomalies from peer-to-peer devices," IP.com, May 2, 2016, 8 pages, Motorola Solutions, Inc., IP.com No. IPCOM000246067D, Retrieved from the Internet: <URL: https://priorart.ip.com/IPCOM/000246067>.
Libelium, "IoT Products, Meshlium," Libelium.com, Accessed: Aug. 17, 2021, https://www.libelium.com/iot-products/meshlium/, 4 pages.
Schauer, et al., "Estimating Crowd Densities and Pedestrian Flows Using Wi-Fi and Bluetooth," 11th International Conference on Mobile and Ubiquitous Systems: Computing, Networking and Services (MOBIQUITOUS'14) [journal], Jan. 2014, 8 pages, ResearchGateDOI: 10.4108/icst.mobiquitous.2014.257870, Retrieved from the Internet: <URL: DOI:10.4108/icst.mobiquitous.2014.257870>.
Seri et al., "The dangers of Bluetooth implementations: Unveiling zero day vulnerabilities and security flaws in modern Bluetooth stacks," BlueBorne 2017, Armis, https://info.armis.com/rs/645-PDC-047/images/BlueBorne%20Technical%20White%20Paper_20171130.pdf, 41 pages.
Vandijk, "RS.Lab2—Spatiotemporal analysis," YouTube, Feb. 7, 2016, https://www.youtube.com/watch?v=V3BWJLg0L5w, 3 pages.
Versichele, et al., "The use of Bluetooth for analysing spatiotemporal dynamics of human movement at mass events: A case study of the Ghent Festivities," Applied Geography, Mar. 2012, pp. 208-220, vol. 32, Issue 2, ScienceDirect, DOI:10.1016/j.apgeog_2011.05.011, Retrieved form the Internet: <URL: https://www.sciencedirect.com/science/article/abs/pii/S0143622811000944>.
Weppner, et al., "Bluetooth Based Collaborative Crowd Density Estimation with Mobile Phones," 2013 IEEE International Conference on Pervasive Computing and Communications (PerCom), Mar. 2013, pp. 193-200, IEEE, San Diego, CA, Retrieved from the Internet: <URL: https://ieeexplore.ieee.org/document/6526732>.
Tav et al., "Approximating Population Density Based on Device Movements," Application No. PCT/EP2022/075836, Filed: Sep. 27, 2022, 27 pages. (Specs + Drawings).
Tav et al., "Approximating Population Density and Post-Incident Scenario Analysis", U.S. Appl. No. 17/450,074, filed Oct. 6, 2021, 33 Pages.

* cited by examiner

CROWD DENSITY ANALYSIS WITH MULTIPLE REGIONS

BACKGROUND

The present invention relates generally to the field of computing, and more particularly to the Internet of Things (IoT).

IoT is a conception of the internet as a network of not only typical computing devices, but also a variety of objects and fixtures connected to that network. These objects have processors, radios, or sensors, and related capabilities. IoT brings together several different technologies to power smart homes, smart cities, and a variety of different businesses. Objects can be stationary—such as networking devices and household appliances—or mobile—such as vehicles, headphones, watches, and cellular phones. These networks can help monitor and manage real-world situations with computational efficiency.

SUMMARY

According to one embodiment, a method, computer system, and computer program product for crowd density analysis with multiple regions is provided. The embodiment may include identifying three or more local measurement nodes. The embodiment may also include defining one or more bins, each bin comprising at least three local measurement nodes from the three or more local measurement nodes. The embodiment may further include mapping one or more regions corresponding to a bin from the one or more bins. The embodiment may also include identifying a device in a region. The embodiment may further include creating a profile corresponding to the identified device. The embodiment may also include calculating a population density based on a number of created profiles in a region from the one or more regions.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to IoT. The following described exemplary embodiments provide a system, method, and program product to, among other things, provide crowd density analysis by following motion of devices through multiple regions. Therefore, the present embodiment has the capacity to improve the technical field of IoT by allowing for greater insight regarding the flow of civilian and pedestrian traffic through areas such as smart cities and airports over time.

As previously described, IoT is a conception of the internet as a network of not only typical computing devices, but also a variety of objects and fixtures connected to that network. These objects have processors, radios, or sensors, and related capabilities. IoT brings together several different technologies to power smart homes, smart cities, and a variety of different businesses. Objects can be stationary-such as networking devices and household appliances—or mobile-such as vehicles, headphones, watches, and cellular phones. These networks can help monitor and manage real-world situations with computational efficiency.

Measuring and managing the flow of traffic can be crucial in assisting cities, building managers, and event organizers to maintain safe and efficient paths for vehicles, pedestrians, and cyclists. However, existing solutions may use imprecise methods such as camera matching photogrammetry, satellite geolocation, or cellular tower triangulation, which in turn leads to dramatically imprecise measures of the density and flow of crowds or traffic. As such, it may be advantageous to use multiple local measurement nodes to create multiple measurement regions, anonymously triangulate users, and measure the density and flow of population.

According to one embodiment, a program for crowd density analysis with multiple regions is provided. The crowd density analysis program may define one or more bins based on three or more local measurement nodes. The crowd density analysis program may then map out three or more regions corresponding to the bins. The crowd density analysis program may further identify a device in a region, for example upon a device entering or becoming visible within a region and create a unique profile for each device. Finally, the crowd density analysis program may calculate a population density by measuring the number of unique profiles present in one or more regions.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
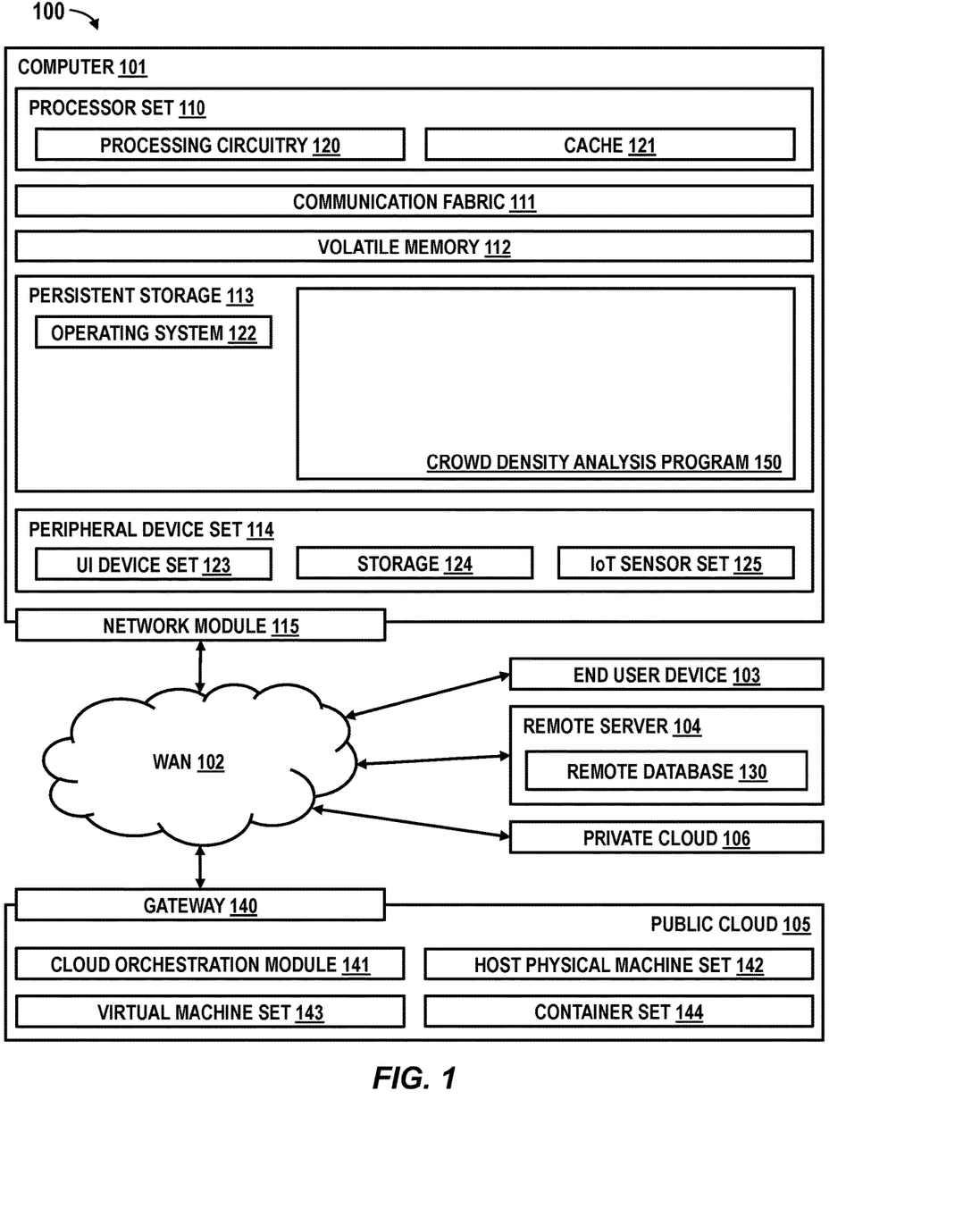
FIG. 1 illustrates an exemplary networked computer environment according to at least one embodiment.

Referring now to FIG. 1, computing environment 100 contains an example of an environment for the execution of at least some of the computer code involved in performing the inventive methods, such as crowd density analysis program 150. In addition to crowd density analysis program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and crowd density analysis program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed conversation is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in crowd density analysis program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in crowd density analysis program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of the Bluetooth Special Interest Group and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The crowd density analysis program 150 may define one or more bins based on three or more local measurement nodes. The crowd density analysis program 150 may then map out one or more regions corresponding to the bins. The crowd density analysis program 150 may identify a device in a region and create a unique profile for each device. The crowd density analysis program 150 may then calculate a population density by measuring the number of unique profiles present in one or more regions.

Furthermore, notwithstanding depiction in computer 101, crowd density analysis program 150 may be stored in and/or executed by, individually or in any combination, end user device 103, remote server 104, public cloud 105, and private cloud 106. The crowd density analysis method is explained in more detail below with respect to FIGS. 2 and 3.

Figure 2:
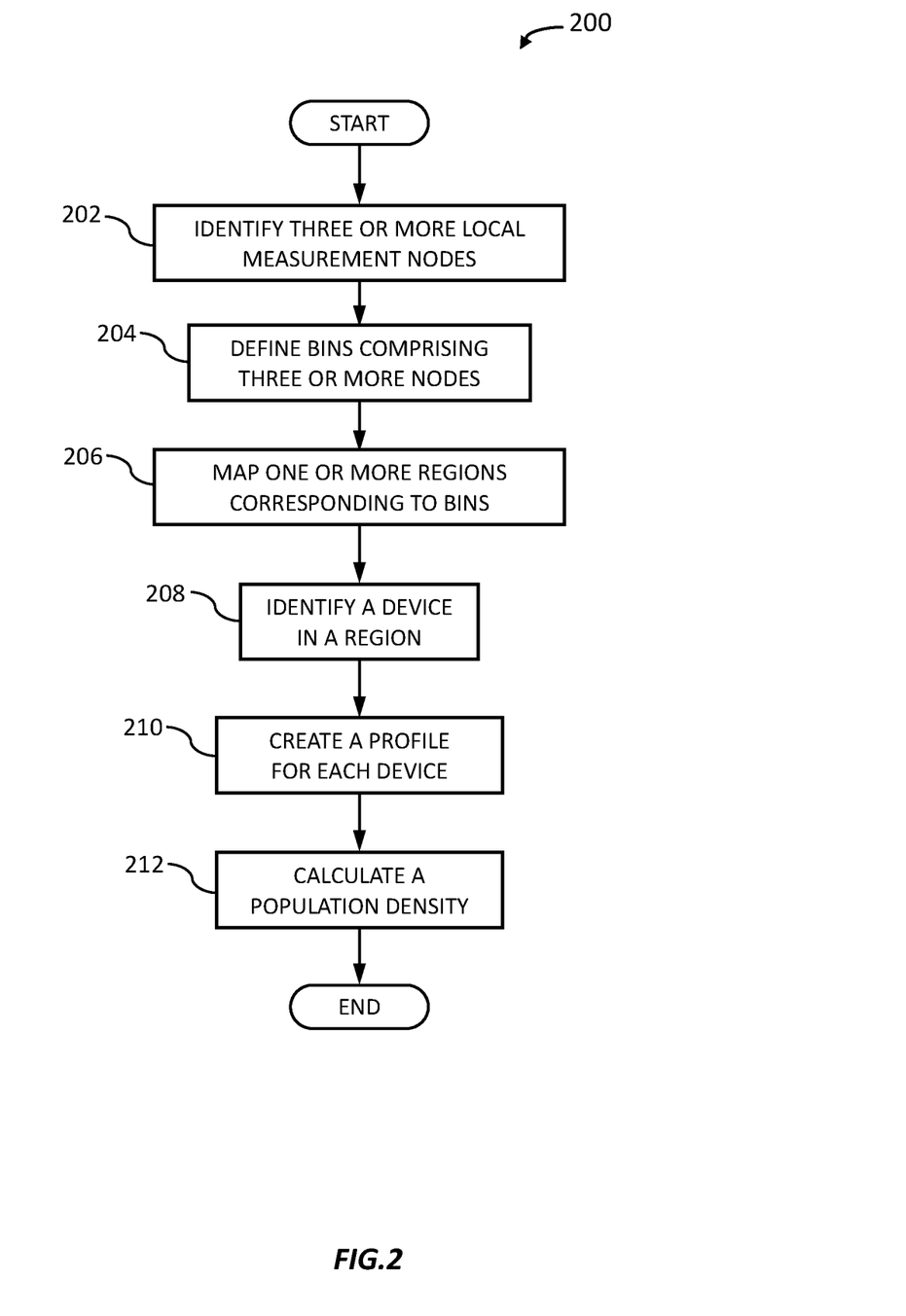
FIG. 2 illustrates an operational flowchart for a process for crowd density analysis with multiple regions.

Referring now to FIG. 2, an operational flowchart for a process for crowd density analysis with multiple regions 200 is depicted according to at least one embodiment. At 202, the crowd density analysis program 150 identifies three or more local measurement nodes. A local measurement node may include a wireless router, a Bluetooth®-enabled device, a wireless pineapple device, a local edge server, or any other device useful for measuring the presence of wireless devices as part of crowd density analysis.

In a preferred embodiment, a local measurement node may be a wireless pineapple device. A pineapple device may be used to maintain a large number of wireless connections at once, gather publicly broadcast wireless data such as an SSID, MAC address, or Bluetooth® MAC. Although pineapple devices are known for use in wireless security applications and Man-In-The-Middle (MITM) attacks, the present embodiment uses their unique properties among networking devices to support gathering of anonymous data from a large number of devices, as may be seen in a busy public area.

In another embodiment, a local measurement node may be an ordinary wireless router or switch or similar device capable of monitoring publicly broadcast Wi-Fi signals, or a Bluetooth®-enabled device capable of monitoring publicly broadcast Bluetooth® signals. As another alternative, a local edge server or other computing device capable of monitoring such signals directly or through interaction with a connected device, such as an embedded wireless radio, a peripheral wireless radio, or a wired connection to a wireless router.

In at least one embodiment, a local measurement node may be mounted on, embedded in, or communicatively coupled with a fixture in an area. A fixture may include, for example, a traffic signal, a street sign, a billboard or digital signage board, or an information sign such as transit information in a train station or airport or map information in a shopping mall. Alternatively, a local measurement node may be mounted on, embedded in, or communicatively coupled with an object that can move, such as a vehicle, cart, or mobile kiosk. For example, a local measurement node may be mounted on the interior of a food truck that is known to often park in four different locations, each useful for the process for crowd density analysis with multiple regions 200.

In an alternate embodiment, the crowd density analysis program 150 may further identify additional information regarding the area surrounding the three or more local measurement nodes. Additional information may include map information about the area, such as the size of a sidewalk, street, or intersection; the status of one or more traffic signals in the area; weather sensors gauging the temperature, pressure, or precipitation rate in the area.

Then, at 204, the crowd density analysis program 150 defines one or more bins, each bin comprising three or more nodes. A bin may be used to define one or more regions below at 206. A bin may be represented, simply, as a list of the nodes comprising the bin, as pointers to the bin, or in any other manner useful for representing a bin.

Bins may be defined exhaustively based on every possible combination of three nodes from the three or more nodes, or may be defined by another process such as a process for determining which region definitions would be best for crowd density analysis. The process of defining bins may be performed, for example, manually, randomly or pseudo-randomly, or by a process of artificial intelligence.

Next, at 206, the crowd density analysis program 150 maps one or more regions corresponding to bins. A region may be a two- or three-dimensional space where crowd density analysis may occur. A region may, for example, be a maximum amount of space circumscribed by the nodes of a given bin, the space of the shape created by drawing a straight line between each node in a given bin, or the wireless range of a single node. A region may correspond to a bin or to a node.

In at least one embodiment, a region may be a two- or three-dimensional space of any shape appropriate for crowd density analysis. For example, a region for a single node may be the shape of the wireless range of that node, which may be represented as a circle on the horizontal plane, a sphere, or the actual oblong shape formed by the actual wireless range of the node as blocked by such things as walls and electronics.

Alternatively, a region for a bin of three nodes may be the triangle formed by the three nodes, a triangle-like region bounded by the limits of the wireless range of each node, a triangular prism formed by a triangle on the horizontal plane with a preconfigured height above and below the nodes, or any other shape that can reasonably be surveyed by the nodes.

A region may be mapped in light of map information, including additional information collected at 202. For example, if a node is on a sidewalk and the crowd density analysis program 150 is being used in the context of a sidewalk, and the natural wireless range of a node is a sphere, but portions of the sphere reach the street or a store on the side of the sidewalk, mapping a region may include removing the road, the store, or both the road and the store from the region.

In further embodiments, the crowd density analysis program 150 may map a sub-region or a greater area. A sub-region may be, for example, the portion of a region that is thought to be on the sidewalk, the portion of a region that is at ground level, the portion of two regions that overlap, or the portion of a region that does not overlap with any other regions. A greater area may be, for example, a combination of multiple regions, an entire intersection when only part of the intersection is covered by regions, an entire shopping mall when only parts of the mall are covered by regions, or an entire room where only parts of the room are covered by regions.

An exemplary embodiment mapping five regions, with two corresponding to one bin and three corresponding to the nodes that comprise that bin, is provided below at FIG. 3.

Then, at 208, the crowd density analysis program 150 identifies a device in a region using one or more local measurement nodes. A device may be a computing device, a vehicle, or any other IoT-enabled object. A device may be identified upon entering a region, or upon becoming discoverable within a region. In addition to identification by local measurement nodes, the crowd density analysis program 150 may use other techniques to assist in identification, including computer vision techniques such as camera matching photogrammetry, satellite geolocation, or cellular tower triangulation, or by a process of correlation between different methods.

In at least one embodiment, a device may be a computing device, a vehicle, or any other IoT-enabled object. Computing devices may include mobile phones, tablets, laptop computers, or similar devices. Vehicles may include cars, trucks, boats, helicopters, scooters, motorcycles, or any other vehicle with wireless features discoverable by a local measurement node. Other IoT-enabled objects may include peripheral Wi-Fi or Bluetooth®-enabled devices, such as wireless headphones, smart watches, fitness tracking devices, or anything else discoverable by a local measurement node.

In another embodiment, devices may be identified upon entering a region, or upon becoming visible within a region. A device may become visible, for example once a user turns the device on, once a user turns on a wireless feature for the device, or once the signal strength connecting the device to the local measurement node is sufficient to identify the device. The crowd density analysis program 150 may scan a region to check for devices at any frequency, including continuously or substantially continuously (at a very high frequency), or in response to any event.

The crowd density analysis program 150 may, in an alternate embodiment, use information gathered below about the direction or velocity of a device in a region to predict the device's entry into another region, and scan the region to check for the expected device at the predicted time.

Identifying may be performed using one or more local measurement nodes. Identifying may include anonymously scanning for publicly broadcast data using wireless networking features of a local measurement node, including identifying an SSID, MAC, Bluetooth® MAC, or list of connections a device holds to other devices (such as a connection between a mobile phone and a Bluetooth® headset). Identifying may further include identifying a specific location of a device in a region, such as by triangulation, or identifying the location of the device repeatedly over time so as to estimate its direction or velocity. Further still, identifying may include measuring a Wi-Fi signal strength or a Bluetooth® signal strength between the identified device and a local measurement node. Identifying may be performed according to opt-in procedures.

In a further embodiment, the crowd density analysis program 150 may collect supplemental data. Supplemental data may include information about the direction or velocity of a device using device sensors; the make, model, size, and weight of a device such as a vehicle, or any other data that may be helpful in the process of crowd density analysis with multiple regions 200.

In at least one embodiment, identifying may involve use of other techniques, including computer vision techniques such as camera matching photogrammetry, satellite geolocation, or cellular tower triangulation, or by a process of correlation between different methods. For example, the crowd density analysis program 150 may utilize additional information providing a video feed of an intersection in a region to check the flow of vehicles against the information collected by local measurement nodes in order to identify vehicles that are not visible to local measurement nodes, such as older vehicles without wireless computing capabilities. Alternatively, the crowd density analysis program 150 may identify animals using photographs taken by satellite.

In another embodiment, information about identified devices may be stored only in transitory memory for the purpose of immediate use in crowd density analysis. Alternatively, information identified devices may be stored anonymously and securely in local measurement nodes, local edge computing servers, traditional internet servers, cloud computing servers, or a secure peer-to-peer tokenized storage model. Stored information may be deleted or purged regularly or frequently, such as at a frequency of once per day.

Next, at 210, the crowd density analysis program 150 creates a profile corresponding to each device. A profile may be an anonymous representation of a subject such as a vehicle or individual for the purpose of accurately counting population density, traffic density, or flow thereof. Creating a profile may include identifying a commonality between devices that represent the same subject, or deduplicating multiple profiles that represent the same subject. A profile may include, for example, anonymous identifying information such as a unique identifier; information about the location, speed, or direction of a particular subject; the approximate amount of time the subject spends in a region; or contextual information correlating patterns regarding a device's movement across multiple regions.

A profile may be an anonymous representation of a subject such as a device, vehicle, or individual person. Furthermore, profiles may include, for example, profiles for pets, bicycles, or any other entities identified by the crowd density analysis program 150.

In at least one embodiment, creating a profile may include identifying a commonality between devices that represent the same subject, or deduplicating multiple profiles that represent the same subject. For example, a commonality may include information in a list of device connections indicting that two devices are connected to one another via Bluetooth®, a common speed and direction between two devices as they travel through multiple regions, or use of image processing to find, e.g., a person using a tablet and wireless headphones where only one tablet and only one pair of wireless headphones were identified at 208.

In another embodiment, profiles may be stored only in transitory memory for the purpose of immediate use in crowd density analysis. Alternatively, profiles may be stored anonymously and securely in local measurement nodes, local edge computing servers, traditional internet servers, cloud computing servers, or a secure peer-to-peer tokenized storage model. Profiles may be deleted or purged regularly or frequently, such as at a frequency of once per day.

A profile may include anonymous identifying information such as a unique identifier; information about the devices associated with the profile; information about the location, speed, or direction of the subject; the weight of the subject, for example if the subject is a vehicle; the approximate amount of time the subject spends in a region; a history of regions the subject entered in order, or with particular times; or contextual information correlating patterns regarding a device's movement across multiple regions.

The crowd density analysis program 150 may change associations between devices, profiles, and subjects over time. For example, the crowd density analysis program 150 may correct errors over time, or may identify two human subjects entering a vehicle.

Finally, at 212, the crowd density analysis program 150 calculates a population density based on the presence of one or more profiles in one or more regions. A population may include a number of devices, a number of people, a number of vehicles, or of any other types of entity or subject identified by the crowd density analysis program 150. A population density may be calculated for a region, sub-region, or greater area, and may be calculated at a given time or over a period of time. A population density may be calculated per region, sub-region, or greater area; per unit area or per unit volume; per unit time; as a flow rate; as an abstract weighted representation of population density; compared to a base expected level of population density; or in any other manner that is useful to a user. The calculated population density may then be used to redirect or otherwise manage traffic, identify or react to incidents, or redirect public resources.

A population density may be calculated for a region, sub-region, or greater area. For example, if there are three regions in a room, then the crowd density analysis program 150 may calculate a population density for each region, and calculate an approximate population density for the room, for example by extrapolating from the population densities of each region, by calculating a population flow rate at the entrances and exits of the room, or by combining the calculated population densities with other data, such as historical data about the most and least populated parts of the room.

A population density may be calculated per region, sub-region, or greater area, or per unit area, unit volume, or unit distance. For example, a population density on a bridge may be 18 cars on the bridge, or 29 cars per square mile of drivable area on the bridge.

Population density may be calculated at a particular time, over time, per unit time, or as a flow rate over time. For example, calculating population density over time may include calculating the total number of unique subjects in a given region over the course of eight hours, calculating the number of vehicles that move through an intersection over the course of 24 hours, or calculating the number of people in a store times the amount of time they spend in the store per unit time the store is open.

Calculating population density may further include calculating a complex or abstract representation of population density, such as an array of population densities over time or a discrete scale of population densities where the discrete population densities are labeled "empty," "light traffic," "crowded," and "very crowded."

A population density may be calculated relative to a base level of population density. For example, a store may use the crowd density analysis program 150 to obtain flat population density data for one year, and then may calculate both a flat rate of population density and relative population density compared to the average population density over the course of the year, and proceed to represent the relative population density using discrete abstract labels "not busy," "less busy than usual," "about as busy as usual," "more busy than usual," and "very busy." Further, population density may include multiple forms of population density, such as a static population density and a population flow rate, or complex statistics derived from such population density calculations, such as a stagnation rate representing the degree to which a large population in a given region has stopped moving, signifying a potential blockage or incident.

Alternatively, a population density may be calculated in any other manner that is useful to a user. For example, a population density may be represented graphically on a map of a shopping mall as a "heat map," where more populous areas on the map are presented as a dark red, and less populous areas on the map are presented as a light yellow, and medium population areas are presented as orange.

In another embodiment, the crowd density analysis program 150 may track population density among a large number of regions, and draw conclusions related to the population density patterns. For example, if a city government places a high-confidence region at each intersection in the city, the crowd density analysis program 150 may track population flow rate patterns between each intersection.

In a further embodiment, the crowd density analysis program 150 may use a calculated population density to identify or react to an incident. An incident may be, for example, a traffic accident, an adverse weather incident, a violent attack, a blockage, a wet or hazardous floor area, an unusually large crowd of pedestrians, an unusually heavy flow of traffic, or any other noticeable change in the flow of traffic. Population data indicating an incident may be checked against other data, such as data collected from a local weather API or news service, to better determine the nature or severity of the incident, predict future impact of the incident, or predict when the incident will pass.

Identifying or reacting to an incident may further include analyzing an incident or the scenario relating to the incident. For example, analyzing a traffic accident may include analyzing the population data and profile information at, shortly before, and shortly after the time of the accident to identify two vehicles that were involved in the accident, a specific location blocked off by the accident, the effect of the accident on the flow of traffic, optimal route changes for vehicles and pedestrians, and identifying patterns that may be useful in reacting or responding to the accident. Reacting or responding to the described accident may include, for example, rerouting users or advising a public traffic safety official on potential changes to traffic light patterns.

The calculated population density may then be used, e.g. by a user or by an automated process, to redirect or otherwise manage traffic, react to incidents, or redirect public resources. For example, the crowd density analysis program 150 may identify an obstruction to the flow of traffic on $1^{st}$ Avenue and redirect users to $2^{nd}$ Avenue. Alternatively, the crowd density analysis program 150 may notice unusually high foot traffic near a stadium and direct taxis to an area near the stadium. As another example, the crowd density analysis program 150 may use regions placed at bus stops to determine when to send additional busses along the bus route, or to determine that a bus driver can skip a stop as there are no users at that stop. As yet another example, the crowd density analysis program 150 may prepare visualizations of population density and provide those visualizations to a traffic expert in a city planner's office.

Figure 3A:
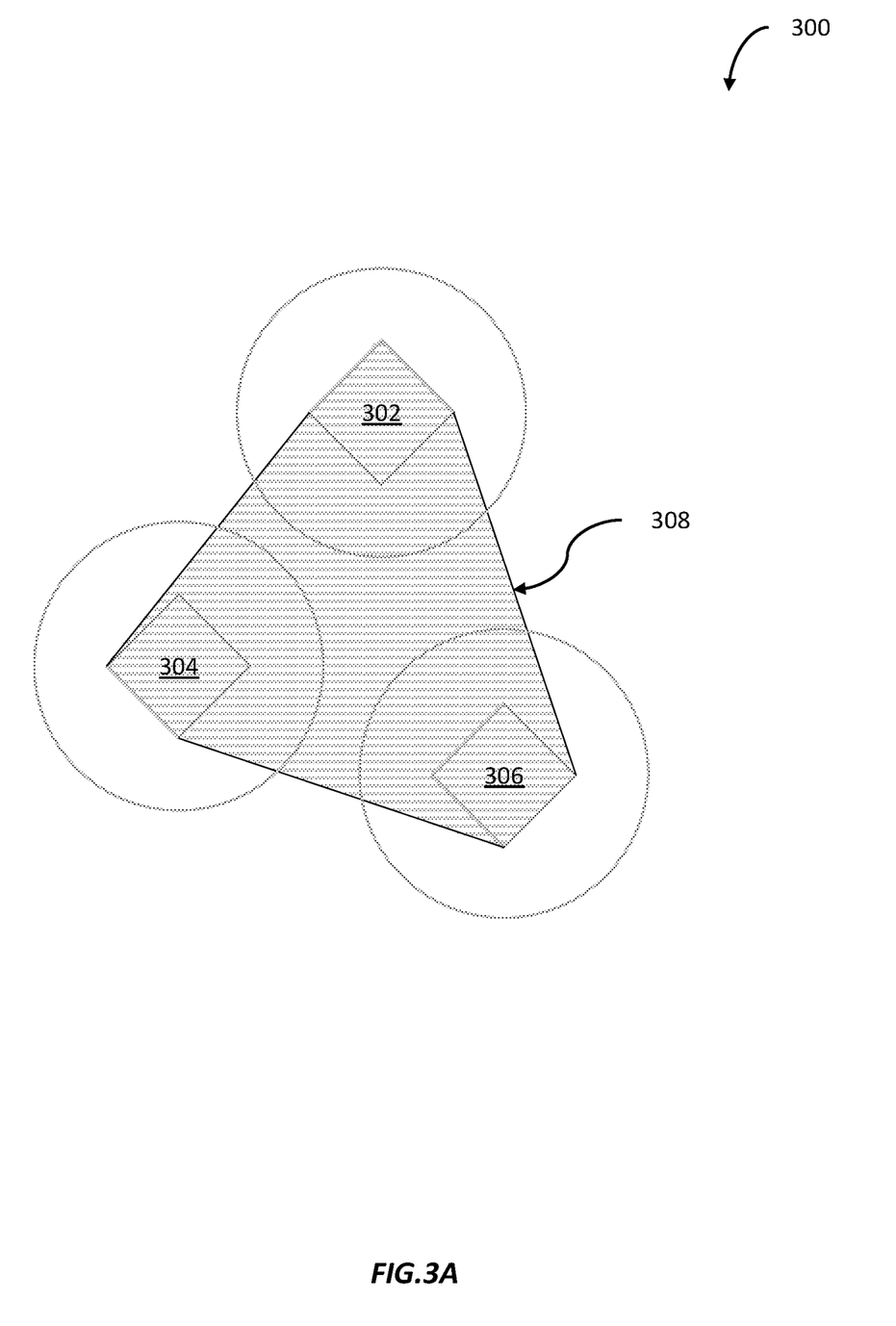
FIGS. 3A and 3B illustrate several regions corresponding to a bin of three local measurement nodes according to at least one embodiment.
Figure 3B:
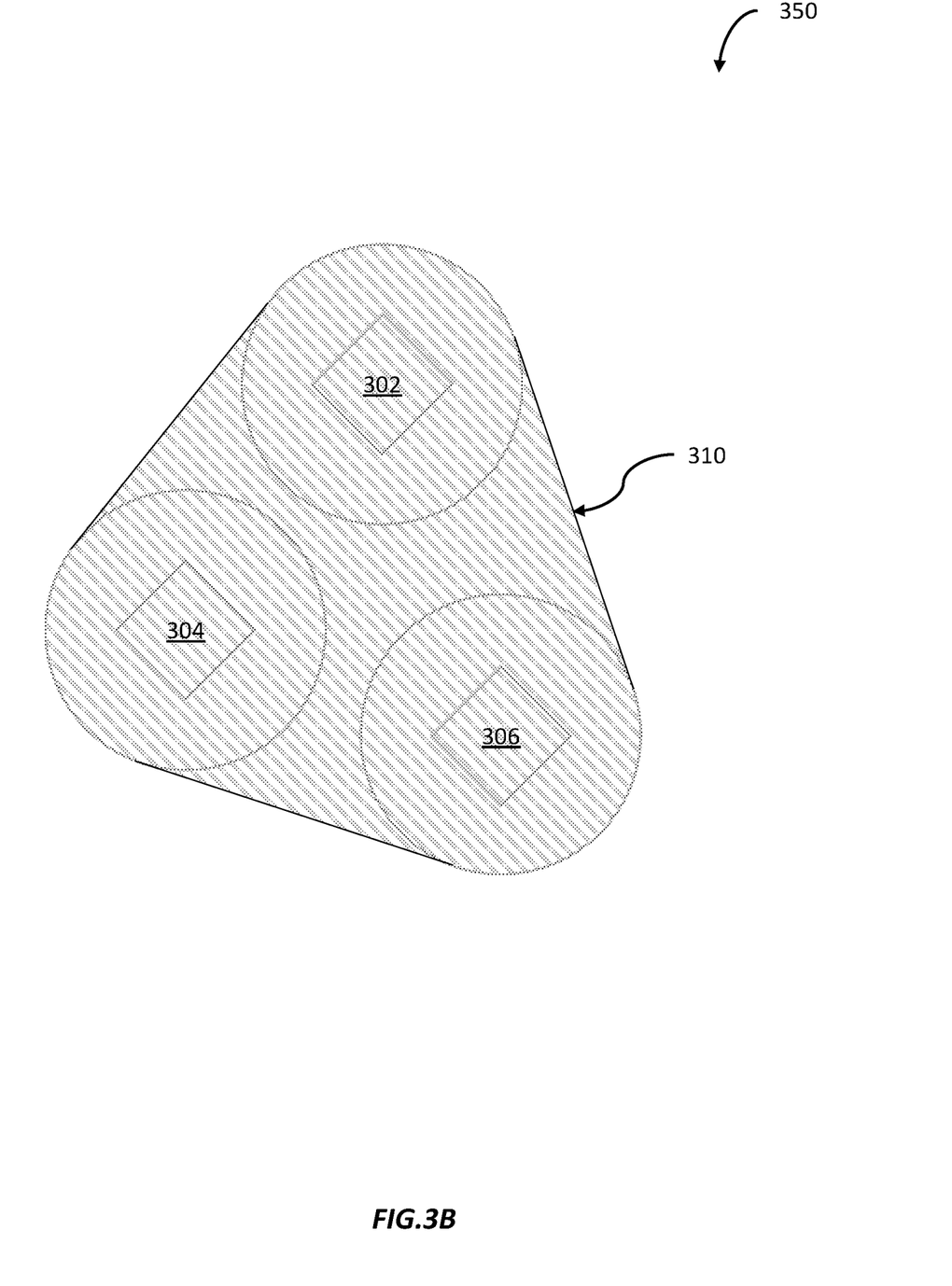

FIGS. 3A and 3B portray one mapping of five regions, with two regions (a smaller region, highlighted at 300, and a larger region, highlighted at 350) corresponding to one bin and three regions corresponding to the nodes that comprise that bin, and with multiple sub-regions.

In at least one embodiment, a bin may consist of three local measurement nodes 302, 304, and 306. This bin may form smaller region 308 (highlighted in FIG. 3A as a shaded region) and larger region 310 (highlighted in FIG. 3B), where larger region 310 is outside the shaded region of smaller region 308 but confined within the exterior perimeter of the range of the three local measurement nodes. Smaller region 308 may provide increased accuracy compared to larger region 310 through use of triangulation techniques and through measuring the signal strengths between measurement nodes 302, 304, and 306 and the devices being located. Larger region 310 may provide insight into a greater sampling of the population and may be useful in correlating movements of subjects between different areas.

Regions may further include a region surrounding each local measurement node 302, 304, and 306. In a further embodiment, crowd density analysis program 150 may identify one or more sub-regions, such as the sub-regions where a smaller region corresponding to a bin overlaps the surrounding region surrounding a local measurement node, portrayed in FIG. 3A as the portions of shaded area that overlap with the circles around each local measurement node 302, 304, and 306. These sub-regions may be of note due to the relatively high accuracy information that can be obtained there, as both a sub-region of smaller region 308 and of the ordinary wireless range of local measurement nodes 302, 304, and 306.

The shapes of regions determined at 206 are not limited to circular and triangle-like shapes, as represented in FIG. 3, but may be any two-dimensional or three-dimensional shapes functionally measurable by the local measurement nodes comprising the bin.

It may be appreciated that FIGS. 2 and 3 each provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   identifying three or more local measurement nodes;
   defining one or more bins, each bin comprising at least three local measurement nodes from the three or more local measurement nodes;
   mapping one or more regions corresponding to a bin from the one or more bins;
   identifying a device in a region;
   creating a profile corresponding to the identified device; and
   calculating a population density based on a number of created profiles in a region from the one or more regions.

2. The method of claim 1, wherein at least one local measurement node from the three or more local measurement nodes is a wireless pineapple device.

3. The method of claim 1, wherein the one or more regions include at least a smaller region and a larger region.

4. The method of claim 1, wherein calculating a population density further comprises correlating device movements across two or more regions from the one or more regions.

5. The method of claim 1, wherein creating the profile further comprises deduplicating the profile from one or more other profiles that represent the same subject as the profile.

6. The method of claim 1, wherein the calculated population density is used to identify or react to an incident.

7. The method of claim 1, wherein a region from the one or more regions is a three-dimensional region.

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying three or more local measurement nodes;
   defining one or more bins, each bin comprising at least three local measurement nodes from the three or more local measurement nodes;
   mapping one or more regions corresponding to a bin from the one or more bins;
   identifying a device in a region;
   creating a profile corresponding to the identified device; and
   calculating a population density based on a number of created profiles in a region from the one or more regions.

9. The computer system of claim 8, wherein at least one local measurement node from the three or more local measurement nodes is a wireless pineapple device.

10. The computer system of claim 8, wherein the one or more regions include at least a smaller region and a larger region.

11. The computer system of claim 8, wherein calculating a population density further comprises correlating device movements across two or more regions from the one or more regions.

12. The computer system of claim 8, wherein creating the profile further comprises deduplicating the profile from one or more other profiles that represent the same subject as the profile.

13. The computer system of claim 8, wherein the calculated population density is used to identify or react to an incident.

14. The computer system of claim 8, wherein a region from the one or more regions is a three-dimensional region.

15. A computer program product, the computer program product comprising:
one or more computer-readable tangible storage medium and program instructions stored on at least one of the one or more tangible storage medium, the program instructions executable by a processor capable of performing a method, the method comprising:
identifying three or more local measurement nodes;
defining one or more bins, each bin comprising at least three local measurement nodes from the three or more local measurement nodes;
mapping one or more regions corresponding to a bin from the one or more bins;
identifying a device in a region;
creating a profile corresponding to the identified device; and
calculating a population density based on a number of created profiles in a region from the one or more regions.

16. The computer program product of claim 15, wherein at least one local measurement node from the three or more local measurement nodes is a wireless pineapple device.

17. The computer program product of claim 15, wherein the one or more regions include at least a smaller region and a larger region.

18. The computer program product of claim 15, wherein calculating a population density further comprises correlating device movements across two or more regions from the one or more regions.

19. The computer program product of claim 15, wherein creating the profile further comprises deduplicating the profile from one or more other profiles that represent the same subject as the profile.

20. The computer program product of claim 15, wherein the calculated population density is used to identify or react to an incident.

* * * * *